United States Patent [19]

Endo et al.

[11] Patent Number: 5,029,181
[45] Date of Patent: Jul. 2, 1991

[54] AUTOMATIC CALIBRATION DEVICE FOR DIRECT SPECTRUM SPREAD RECEIVER

[75] Inventors: Akihiko Endo; Masao Nakano; Hiroshi Takeda, all of Tokyo, Japan

[73] Assignee: Kyocera Corporation, Kyoto, Japan

[21] Appl. No.: 604,988

[22] Filed: Oct. 25, 1990

Related U.S. Application Data

[63] Continuation of Ser. No. 543,685, Jun. 26, 1990, abandoned.

[30] Foreign Application Priority Data

Jul. 17, 1989 [JP] Japan .................................. 1-184133

[51] Int. Cl.⁵ .............................................. H04K 1/00
[52] U.S. Cl. ............................................... 375/1
[58] Field of Search ................................... 375/1

[56] References Cited

U.S. PATENT DOCUMENTS 4,841,545  6/1989  Endo et al. ............................... 375/1
4,932,036  6/1990  Goradia et al. .......................... 375/1
4,943,975  6/1990  Kurihara et al. ......................... 375/1

Primary Examiner—Thomas H. Tarcza
Assistant Examiner—Tod Swann
Attorney, Agent, or Firm—Spensley Horn Jubas & Lubitz

[57] ABSTRACT

A simulated reception signal is produced by modulating an AC signal having the same frequency as the reception frequency with a modulating signal produced using two pseudo noise codes delayed by ½ or 3 chips. In a calibrating mode, in which the simulated reception signal is chosen, a reference voltage to a comparator for synchronization detection and an output voltage of a differential amplifier for synchronization holding are stored in a CPU. In a receiving mode, in which an actual reception signal is chosen, the CPU controls the comparator and a pseudo noise generator which is included in a delay lock loop on the basis of the stored data.

6 Claims, 3 Drawing Sheets

FIG. 3A
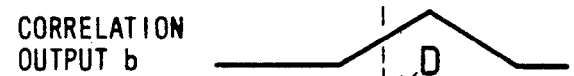
FIG. 3B
FIG. 3C
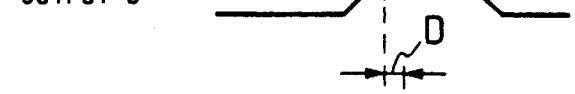
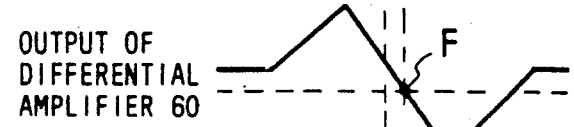

AUTOMATIC CALIBRATION DEVICE FOR DIRECT SPECTRUM SPREAD RECEIVER

This is a continuation of application Ser. No. 543,685 filed on June 26, 1990, now abandoned.

BACKGROUND OF THE INVENTION

The present invention relates to a device useful for a direct spectrum spread receiver in which a transmission signal, obtained by modulating a carrier of, e.g., the UHF band including an information signal in accordance with a spreading code to spread its spectrum to a wide band, is subjected to reverse-spreading modulation to restore the original information signal. The reverse-spreading modulation is performed using a code identical to the spreading code such that the modulation is in synchronization with the spreading code in the received transmission signal. The invention particularly relates to a device of this type which can automatically be calibrated so as to compensate for characteristic changes (drifts) in the receiver circuit due to a temperature change or time lapse.

FIG. 2 shows a receiver circuit of the conventional spectrum spread system. A transmission signal received by an antenna 3 is applied to an RF amplifier 1 and then applied to a correlator 2 which is constituted by amplifiers 21, 22 and 23, multipliers 31, 32 and 33, correlating filters 41, 42 and 43, detectors 51, 52 and 53, a differential amplifier 60, and a comparator 61. The circuit of FIG. 2 further includes a loop filter 7, a voltage-controlled oscillator (VCO) 8, a pseudo noise generator 9, and a shift register 10. The shift register 10 receives a pseudo noise signal (PN signal) from the generator 9 and produces delayed PN signals delayed by 0, ½or 1 chip to be applied to the multipliers 32, 33 and 31, respectively.

When the gain of an amplifier or a DC potential is changed due to a drift, i.e., a characteristic change of circuit elements due to a change in ambient temperature or time lapse, a voltage at the output point C of the detector 53 is changed, causing such erroneous detection that an appropriate correlation detecting signal $S_D$ cannot be obtained, or that a detecting signal $S_D$ is produced when it is not to be produced. Further, even if the correlation detection is performed correctly, there may be the case that an offset voltage or a gain difference appears in the output signals of the detectors 51 and 52, i.e., input signals to the differential amplifier 60, so that a lock point of a delay lock loop is shifted.

FIGS. 3A through 3C are graphs showing the relationship between input signals and an output signal of the differential amplifier 60. FIG. 3A shows the relationship between the output of the differential amplifier 60 and voltages at the correlation detection points a and b in the ideal case in which no drift occurs. On the other hand, in FIG. 3B a gain reduction of an amplifier is reflected in the correlation output at b, and in FIG. 3C a DC level change has occurred in the correlation output at b. As a result, there occurs a phase shift D in the output of the differential amplifier 60, and a tracking point F is shifted to the phase-delaying side in both cases of FIGS. 3B and 3C.

SUMMARY OF THE INVENTION

An object of the present invention is to provide a calibration device for a direct spectrum spread receiver, which can automatically compensate for a drift in the receiver circuit, without employing a temperature-compensation circuit or special circuit elements which would cause complication of circuitry and cost increase.

According to the invention, an automatic calibration device for a direct spectrum spread receiver which restores an information signal in a transmission signal spread in accordance with a wide band spreading code by performing reverse spreading, comprises:

receiving means for receiving the transmission signal and producing a reception signal;

switch means for changing over between the reception signal from the receiving means and a simulation signal from simulation signal generating means;

pseudo noise generating means for generating a pseudo noise code corresponding to the spreading code;

shifting means for producing delayed pseudo noise codes having different delay times on the basis of the pseudo noise code from the pseudo noise generating means;

simulation signal generating means for producing the simulation signal on the basis of two delayed pseudo noise codes from the shifting means;

first comparing means for producing a sync detection signal on the basis of an output signal of the switch means, one delayed pseudo noise code from the shifting means, and a reference voltage from a control means;

second comparing means for producing a sync holding signal on the basis of the output signal of the switch means and two delayed pseudo noise codes from the shifting means; and the control means for receiving the sync detection signal from the first comparing means and the sync holding signal from the second comparing means, producing the reference voltage to be provided to the first comparing means, and controlling the switch means and the pseudo noise generating means; wherein in a calibrating mode, the control means controls the switch means to choose the simulation signal, and stores the reference voltage being provided to the first comparing means and the sync holding signal; and in a receiving mode, the control means controls the switch means to choose the reception signal, provides the stored reference voltage to the first comparing means, and controls the pseudo noise generating means on the basis of the stored sync holding signal so that synchronization of the receiver is held.

BRIEF DESCRIPTION OF THE DRAWINGS

FIGS. 3A through 3C are graphs for explaining the relationship between input signals and an output signal of a differential amplifier in a correlator.

DETAILED DESCRIPTION OF THE PREFERRED EMBODIMENT

Figure 1:
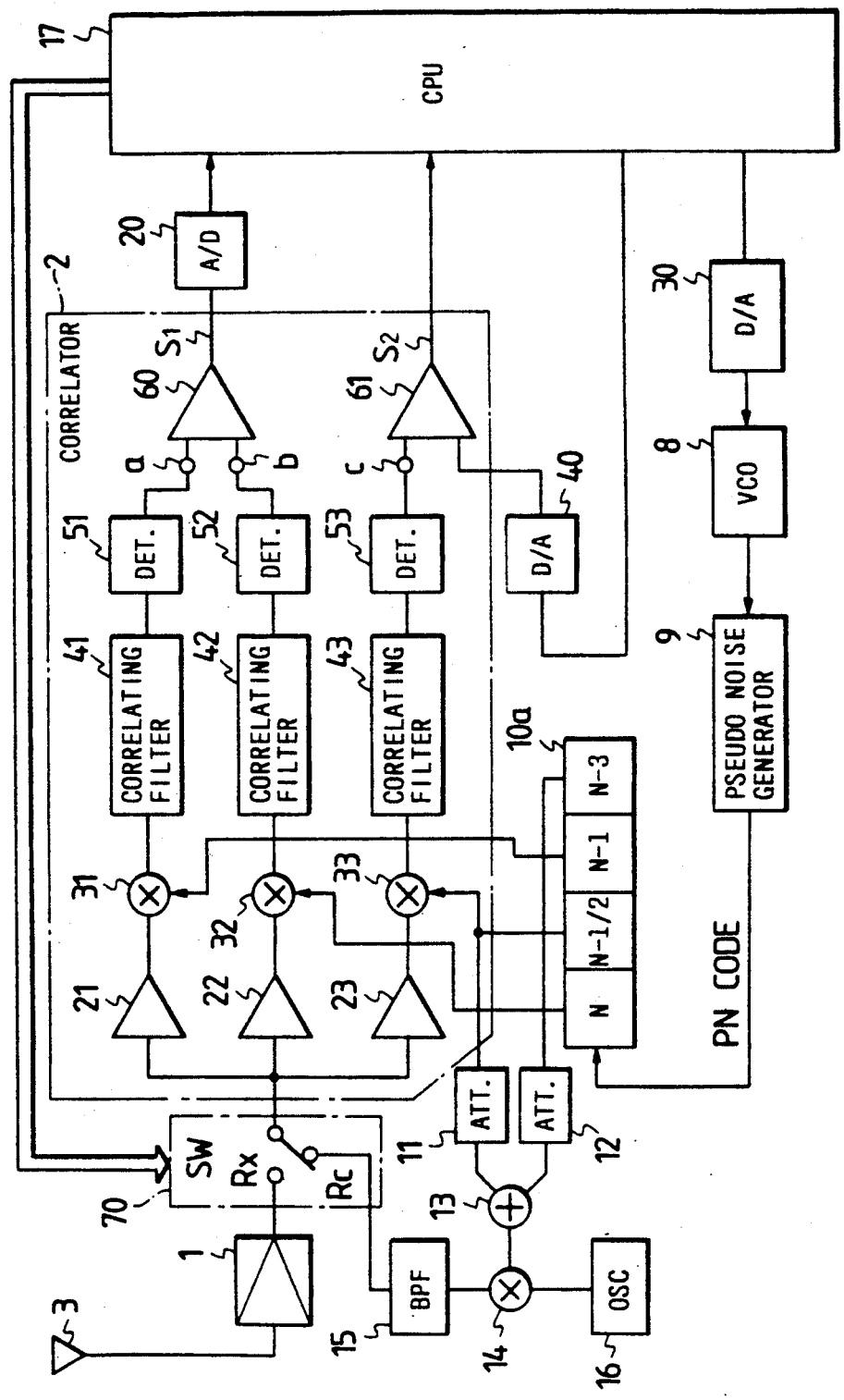
FIG. 1 is a circuit diagram showing an automatic calibration device according to an embodiment of the present invention.

Referring to FIG. 1, an embodiment of the present invention will be described hereunder.

Figure 2:
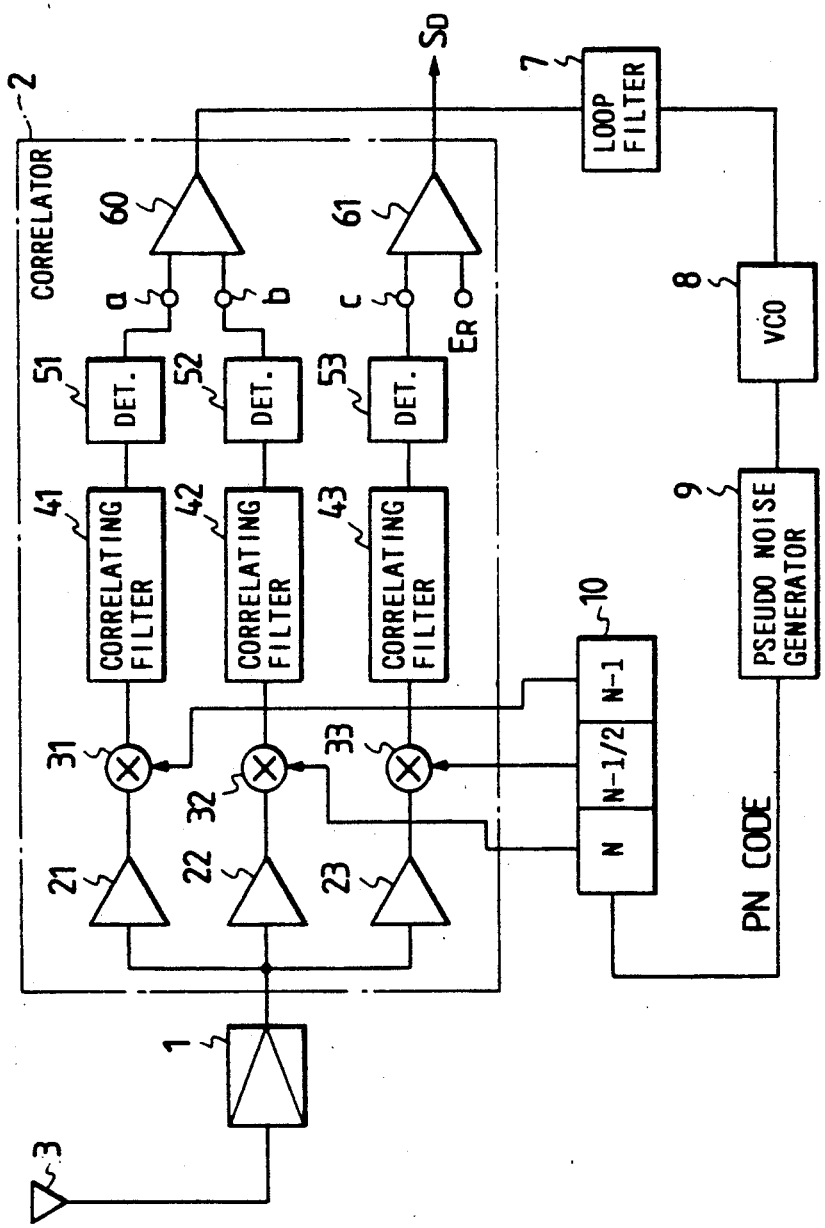
FIG. 2 is a circuit diagram showing a conventional direct spectrum spread receiver.

FIG. 1 is a circuit diagram showing a direct spectrum spread receiver to which an automatic calibration device of the invention is applied. In the drawing, the parts corresponding to those in FIG. 2 are referenced by the same numbers.

A switch 70, which is changed over between a receiving-mode contact $R_x$ and a calibrating-mode contact $R_c$ in accordance with a command supplied from a CPU 17, is provided between the RF amplifier 1 and the correlator 2. Reference numeral 20 designates an A/D converter, 30 and 40 designate D/A converters, and 10a designates a shift register for obtaining delayed pseudo noise (PN) signals by delaying, by 0, $\frac{1}{2}$, 1 or 3 chips, the PN signal generated by the pseudo noise generator 9. The circuit of FIG. 1 further includes attenuators 11 and 12, an adder 13, a multiplier 14, a band pass filter (BPF) 15, and an oscillator 16 for producing an AC signal having a frequency identical to the reception frequency.

Now, when the switch 70 is changed over to the calibrating-mode contact $R_c$ by a command from the CPU 17, the oscillator 16 generates an AC signal having the same frequency as the reception frequency coming into the antenna 3 and the generated AC signal is applied to the multiplier 14.

On the other hand, a PN code is supplied from the pseudo noise generator 9 to the shift register 10a. The PN code is delayed by $\frac{1}{2}$ or 3 chips by the shift register 10a, attenuated by the attenuators 11 and 12, respectively, and then applied to the adder 13. The AC signal from the oscillator 16 is subjected to balanced modulation, that is, spectrum-spread modulation by means of the multiplier 14 with the output signal of the multiplier 14 as a modulating signal. Then, after removal of unnecessary band components by means of the BPF 15, the modulated signal is applied, as a simulated reception signal, to the correlator 2 through the calibrating contact $R_c$.

The simulated signal applied to the correlator 2 is branched, amplified, and applied to the multipliers 31, 32 and 33, respectively. The respective multipliers 31, 32 and 33 are also supplied with PN codes delayed by 1, 0 or $\frac{1}{2}$chip from respective stages of the shift register 10a. Accordingly, the simulated reception signal and the PN code delayed by $\frac{1}{2}$chip are applied to the multiplier 33. Since both signals have the same spreading code, and their bits and frames are synchronized with each other, the simulated reception signal is reversely spread in the multiplier 33, passed through the correlating filter 43, and detected by the detector 53 to obtain a DC voltage at its output point C.

It is noted that the output signal of the adder 13, i.e., input signal to the multiplier 14 includes the PN codes delayed by $\frac{1}{2}$or 3 chips which are shifted in synchronism by 2.5 chips. Therefore, the AC signal from the oscillator 16 is not reversely spread.

Generally, in the case of two trains of different codes or in the case of two trains of the same code which are out of synchronization by one chip or more, a correlation output is zero, that is, there is no correlation therebetween. Accordingly, the output signal of the adder 13 is regarded as having a $\frac{1}{2}$-chip delayed signal component and a 3-chip delayed noise component.

Usually, thermal noise is added to the transmission signal received by the receiver. In the invention, levels of the signal component N-$\frac{1}{2}$and the noise component N-3 are set by the attenuators 11 and 12 so as to accord with such reception condition of the receiver, so that the simulated reception signal exactly assumes the actual reception signal received through the antenna 3.

In the calibrating mode, the simulated signal can be necessarily received as described above. The output voltage of the differential amplifier 60 is passed through the A/D converter 20, and stored in a memory in the CPU 17. A command signal is supplied from the CPU 17 through the D/A converter 40 to a reference voltage input of the comparator 61 for correlation detection so that an output of the comparator 61 is inverted to a high or low level. The binary value supplied to the D/A converter 40 from the CPU 17 is stored in the above memory in the CPU 17.

When the switch 70 is changed over to the receiving-mode contact $R_x$, a reception signal comes in through the antenna 3 to produce a DC output voltage of the detector 53, erroneous operation is never caused because the D/A converter 40 has been properly adjusted by the above-mentioned calibrating operation. Further, after this correlation detection, in order to hold synchronization, the CPU 17 controls the output frequency of the VCO 8 through the D/A converter 30 so that the binary output value of the A/D converter 20 becomes the same as the value which was stored in advance in the CPU 17 in the calibrating mode. The synchronization is held by the delay lock loop.

If the circuit is so constructed that the above-mentioned calibrating operation is carried out, for example, every time when power is turned on, the receiver is not influenced by the characteristic change of circuit elements due to a temperature change or time lapse. A program in the CPU 17 is so constructed that the calibrating operation is carried out so as to prevent the deviation from the setting range of a temperature sensor provided in the receiver.

According to the present invention, the calibration for the synchronous detection and the synchronization holding with respect to the spreading code included in a received transmission signal can be surely performed with high precision by adding relatively simple circuit elements to the conventional receiver circuit.

What is claimed is:

1. An automatic calibration device for a direct spectrum spread receiver which restores an information signal in a transmission signal spread in accordance with a wide band spreading code by performing reverse spreading, comprising:
   receiving means for receiving the transmission signal and producing a reception signal;
   switch means for changing over between the reception signal from the receiving means and a simulation signal from simulation signal generating means;
   pseudo noise generating means for generating a pseudo noise code corresponding to the spreading code;
   shifting means for producing delayed pseudo noise codes having different delay times on the basis of the pseudo noise code from the pseudo noise generating means;
   simulation signal generating means for producing the simulation signal on the basis of two delayed pseudo noise codes from the shifting means;
   first comparing means for producing a sync detection signal on the basis of an output signal of the switch means, one delayed pseudo noise code from the shifting means, and a reference voltage from a control means;
   second comparing means for producing a sync holding signal on the basis of the output signal of the switch means and two delayed pseudo noise codes from the shifting means; and the control means for receiving the sync detection signal from the first comparing means and the sync holding signal from the second comparing means, producing the reference voltage to be provided to the first comparing means, and controlling the switch means and the pseudo noise generating means; wherein in a calibrating mode, the control means controls the switch means to choose the simulation signal, and stores the reference voltage being provided to the first comparing means and the sync holding signal; and in a receiving mode, the control means controls the switch means to choose the reception signal, provides the stored reference voltage to the first comparing means, and controls the pseudo noise generating means on the basis of the stored sync holding signal so that synchronization of the receiver is held.

2. The device according to claim 1, wherein the first comparing means comprises multiplying means for multiplies the output signal of the switch means by a ½-chip delayed pseudo noise code, and a comparator for comparing a multiplication result with the reference voltage from the control means to produce the sync detection signal.

3. The device according to claim 1, wherein the second comparing means comprises first multiplying means for multiplying the output signal of the switch means by a 1-chip delayed pseudo noise code, second multiplying means for multiplying the output signal of the switch means by a nondelayed pseudo noise code, and a differential amplifier for comparing multiplication results to produce the sync holding signal.

4. The device according to claim 1, wherein the simulation signal generating means comprises an oscillator for producing an AC signal having a frequency identical to the reception signal, attenuating means for attenuating a ½-chip delayed pseudo noise code and a 3-chip delayed pseudo noise code, an adder for adding attenuated results to each other, and a multiplier for multiplying the AC signal from the oscillator by an added result to produce the simulation signal.

5. The device according to claim 1, wherein the pseudo noise generating means comprises a D/A converter receiving an output signal of the control means, a voltage-controlled oscillator receiving an output signal of the D/A converter, and a pseudo noise generator for producing the pseudo noise code in response to an output signal of the voltage-controlled oscillator.

6. The device according to claim 5, wherein the control means controls the D/A converter so as to hold the synchronization of the receiver.

* * * * *